United States Patent [19]

Marshall

[11] 4,297,695

[45] Oct. 27, 1981

[54] ELECTROCHROMIC DISPLAY DEVICE

[75] Inventor: Richard C. Marshall, Harpenden, England

[73] Assignee: Xerox Corporation, Stamford, Conn.

[21] Appl. No.: 103,910

[22] Filed: Dec. 17, 1979

[30] Foreign Application Priority Data

Dec. 28, 1978 [GB] United Kingdom ............... 50066/78

[51] Int. Cl.³ ............................................... G02F 1/17

[52] U.S. Cl. .................................... 340/752; 340/785; 340/166 EL; 350/357

[58] Field of Search ......... 340/784, 785, 752, 166 EL; 350/333, 357

[56] References Cited

U.S. PATENT DOCUMENTS

| | | | |
|---|---|---|---|
| 3,811,072 | 5/1974 | Purchase | 340/784 X |
| 3,891,306 | 6/1975 | Mitomo et al. | 340/784 X |
| 3,982,239 | 9/1976 | Sherr | 340/785 X |
| 3,989,355 | 11/1976 | Wilmer | 340/784 X |

*Primary Examiner*—David L. Trafton
*Attorney, Agent, or Firm*—W. Douglas Carothers, Jr.

[57] ABSTRACT

An electrochromic display device is operated by the selective application of electrical signals to first and second electrode matrix addressing means, the potential of the signals being sufficient to produce local color changes in an electrochromic material. Each local color change may be brought about by a short 'expose' pulse with a potential above a threshold for coloration, but with insufficient charge to cause coloration, followed by a longer 'develop' pulse which is below the threshold potential. The first and second matrix addressing means respectively provide these pulses. The electrodes for the two sets of pulses needed to produce an image are multiplexed to substantially reduce the number of driving circuits required.

5 Claims, 3 Drawing Figures

ELECTROCHROMIC DISPLAY DEVICE

BACKGROUND OF THE INVENTION

1. Field of the Invention

This invention relates to a display device of the kind in which electrical signals are selectively applied to a material to cause local changes in an optical characteristic of the material.

The invention is particularly concerned with such a display device in which the electrical signals are applied in matrix fashion to a suitable material. A material in which visible images may be formed by chemically-produced colour changes as a result of the selective use of electrical potentials, is hereinafter called an electrochromic material. With many electrochromic materials, the images are reversible, that is, they can be erased by applying a reverse potential to the imaging material.

2. Description of the Prior Art

In one kind of matrix electrode configuration the electrodes used to selectively apply potentials across the material are in the form of two spaced sets of parallel conductive strips which overlie one another in an orthogonal matrix configuration. By applying potentials to the appropriate strip of each set, it is possible to address any point in the material defined by an intersection of two strips. By making each applied potential less than the coloration threshold potential for the material but greater than one half of the threshold potential, it is possible to cause coloration only at the selected intersection.

This configuration suffers from the disadvantage that in order to pass sufficient charge through the electrochromic material to cause coloration in a usefully short time it is necessary to pass a large current pulse. Although this can be achieved, the necessary circuitry is expensive and difficulty may be experienced in fabricating electrodes of sufficiently high conductivity to cope with such currents.

In our copending U.S. Pat. No. 4,175,836, issued Nov. 29, 1979, there is described and claimed a method and apparatus for causing coloration of an electrochromic material which includes passing through the material an electrical pulse of the polarity which tends to cause coloration and at a potential above the threshold potential for coloration of the material, followed by a DC potential of the same polarity but of magnitude less than the threshold potential. The pulse may contain considerably less than the total electrical charge required to cause coloration, and this gives rise to the advantage that it is possible to manufacture the necessary electronics much more cheaply than if the full charge required to cause coloration were applied to the matrix.

Although the invention of the above mention patent specification makes possible a reduction in the cost of a matrix-addressed display device, it is still necessary to have a large number of separate matrix-addressing lines. Thus in, for example, a 100×100 matrix, 200 lines are needed.

In Strom U.S. Pat. No. 3906451 there is disclosed an apparatus and method for erasing selected gas discharge cells by the use of non-coincident pulses.

SUMMARY OF THE INVENTION

It is an object of the present invention to provide a display device in which individual points in the display are energised by successive electrical signals, the electrodes being multiplexed to substantially reduce the number of driving circuits required.

It is a further object of the invention to provide such a display device utilising an electrochromic material.

It is another object of the invention to provide such a display using a matrix addressing system for energising the individual display points.

According to the present invention, there is provided a display device including apparatus for electrically addressing a material in matrix fashion wherein each individual point in the matrix is addressable to produce a local change in an optical characteristic of the material by the application at that point of two electrical signals in succession, the apparatus including:

first and second matrix addressing means for sequentially applying first and second electrical signals to the matrix, the combination of which is sufficient to cause a local change, the first matrix addressing means for selectively applying the first signals to groups of rows and columns of the matrix defining submatrices, the second matrix addressing means for selectively applying the second signals to individual rows and columns in the defined submatrices to select at least one of the individual cross points therein and producing a local change thereat.

The foregoing and other objects, features and advantages of the invention will be apparent from the following more particular description of a preferred embodiment of the invention, as illustrated in the accompanying drawings.

DESCRIPTION OF THE PREFERRED EMBODIMENTS

Figure 1:
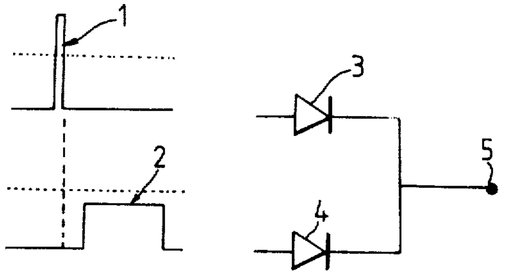
FIG. 1 is a diagram illustrating the electrical signals which will cause a colour change in an electrochromic material.

The apparatus of the invention is particularly useful for providing a visible display with an electrochromic material, which material, as mentioned in the introductory part of the specification, is one which forms a visible image when electrical potentials are selectively applied across it. In practice, in order to make an image visible, it is only necessary for the material to change colour; thus, if working with a white background, a material is particularly suitable if it is white or transparent in one state, but changes to some other colour, preferably contrasting with white, in its other state. This electrochromic material may either be of an inorganic solid, for example a transition metal compound such as tungsten oxide, or an organic liquid or solid such as one of the viologen derivatives. Examples of transition metal compounds used as electrochromic materials may be found in UK Pat. Specification No. 1186541. Examples of viologen derivatives used as electrochromic materials may be found in UK Patent Specifications Nos. 1314049 and 1407133, as well as in in UK Patent Specifications 1302000 and 1376799. Particularly suitable compounds are N(p-cyanophenyl) substituted derivatives of bi-cyclic compounds having two conjugated nitrogen-containing aromatic rings.

As described in the above mentioned patent specifications, there are many derivatives of the bipyridyl group which exhibit colour changes in response to electric current flow. The N(p-cyanophenyl) compound and especially N,N'di(p-cyanophenyl)-4,4' bipyridylium dichloride, is particularly useful in that it is reversibly electrolytically reduced on passage of a current in the appropriate direction to provide an radical which is coloured, usually green, while the parent compound is colourless or pale yellow. Furthermore, in its reduced state, the material is almost completely insoluble, so that it stays on or adjacent one of the electrodes, without displaying the tendency of some of the viologens to redissolve in the absence of a reducing current. Thus with the preferred compound, an image, once formed, tends to be stable even in the absence of any current, but will nevertheless disappear entirely under reverse current flow. It has also been found desirable to include with the electrochromic material a second reversibly oxidizable material, preferably ferrous ammonium sulphate. This provides a ferrous ⇄ ferric ion combination in a particularly suitable form, improving the speed of bleaching on reversing the potential. It does, however, cause a certain amount of deterioration in the memory (ie the stability of the image in the absence of an electric current). This memory effect can be restored by the addition of, for example, an organic acid such as tartaric acid. Further examples of such additives are given in German OLS No. 2511314.

The examples of viologen-type electrochromic materials discussed above are normally used in a liquid form. In an alternative configuration, they may be used in solid form, typically as a layer of polymeric based material.

The electrochromic material is found to have a relatively sharp coloration threshold voltage, below which no coloration occurs. This threshold effect means that display devices using the electrochromic material may be matrix addressed, for example as described in the introductory part of the specification. As an alternative to the DC method of causing coloration of an electrochromic material, it is found that significant coloration can also be caused by the passage of short duration pulses of current, provided that for a given degree of coloration, the total charge passed must be the same as in the D C case. Thus, typically between one and ten millicoulombs $cm^{-2}$ need to be passed to produce significant coloration, and the pulse duration may be as short as 200 microseconds.

Referring now to FIG. 1, it has been shown that it is possible to cause coloration in an electrochromic material by first passing a short duration pulse 1, which does not contain the total charge required for colouring, but which is above threshold voltage, through the cell. This short duration pulse will be called the 'expose' pulse. By subsequently applying a longer duration pulse 2 of a DC voltage below the amplitude of the threshold voltage across the cell it is possible to cause coloration. This longer duration pulse will be called the 'develop' pulse. In this way, it is possible to employ a short duration expose pulse of relatively low current, which permits significantly simpler circuits to be used to provide the pulses and permits the use of electrodes which do not need to be of such high conductivity as when single pulses are used. Neither the expose pulse nor the develop pulse alone will produce any visible coloration, but when both are applied, the characteristic colour will develop over several tens of milliseconds. Development will take place provided the develop pulse is applied within about ten seconds of the expose pulse. The charge flowing from the expose pulse source under these conditions can be as low as twenty microcoulombs $cm^{-2}$, passed in twenty microseconds. The expose and develop pulses are conveniently applied in succession through respective diodes 3 and 4 to a single 'point' 5 of an electrochromic material, to cause coloration at that point.

Figure 2:
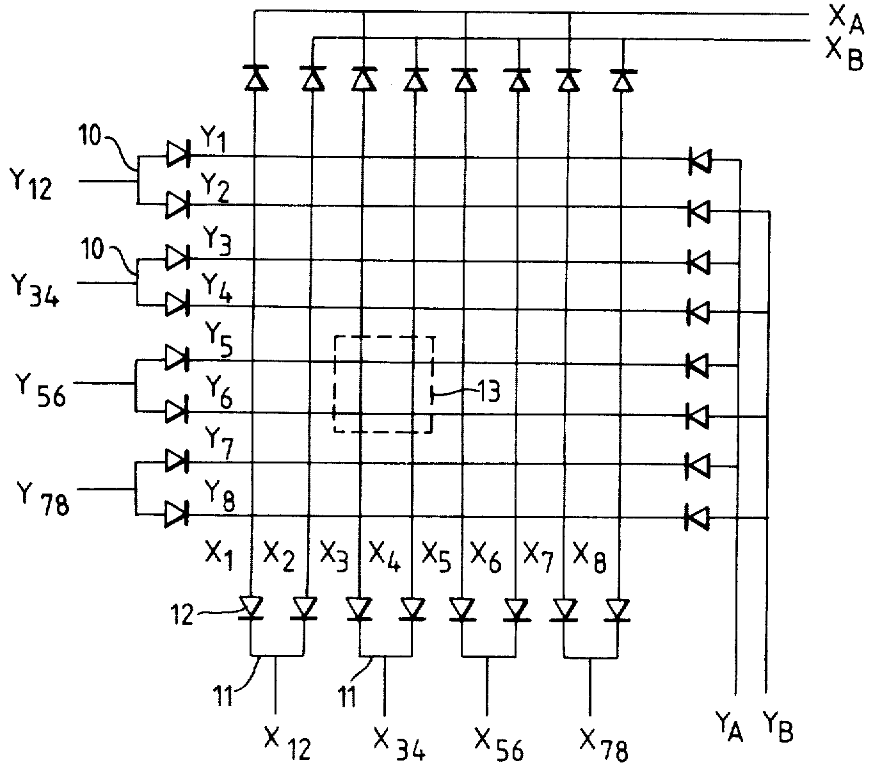
FIG. 2 is a circuit diagram of a simplified version of a device in accordance with the invention.

Referring now to FIG. 2, there is shown a simplified device in accordance with the invention. Lines $X_1$ to $X_8$ (the columns) and $Y_1$ and $Y_8$ (the rows) define a matrix of points at their intersections. The matrix is divided into submatrices by connections 10 and 11 enabling the application of electrical signals to groups of adjacent rows and columns. In the simple case illustrated, the groups are groups of two, and electrical signals may be applied by way of lines $X_{12}$, $X_{34}$, $X_{56}$, $X_{78}$ and $Y_{12}$, $Y_{34}$, $Y_{56}$, $Y_{78}$. Line $X_{12}$ applies an electrical signal, through a diode 12 in each of the lines, to lines $X_1$ and $X_2$. The remaining lines, $X_{34}$ etc, and $Y_{12}$ etc, are similarly connected to lines $X_3$ and $X_4$ etc, and to lines $Y_1$ and $Y_2$ etc. Thus in order to select sub-matrix 13, which contains four points at the intersections of lines $X_3$, $X_4$, $Y_5$ and $Y_6$, it is necessary to apply signals to lines $X_{34}$ and $Y_{56}$.

In addition to the division of the matrix into submatrices, it is also divided into sets of corresponding points within each sub-matrix. To do this, line $X_A$ is connected, through a diode 14 in each line, to lines $X_1$, $X_3$, $X_5$ and $X_7$. In other words, line $X_A$ is connected to the left hand column of each sub-matrix. Similarly $X_B$ is connected (via diodes) to the right hand column of each sub-matrix, and $Y_A$ and $Y_B$ are connected respectively (again via diodes) to the upper and lower rows of the submatrices. By applying signals to $X_A$ and $Y_A$, it is possible to select the top left hand points of all the sub-matrices.

Thus, if it were desired to address the top left hand point of sub-matrix 13 (ie the point defined by the intersection of lines $X_3$ and $Y_5$), this would be done by applying an expose pulse to lines $X_{34}$ and $y_{56}$, followed by a develop pulse to lines $X_A$ and $Y_A$.

Figure 3:
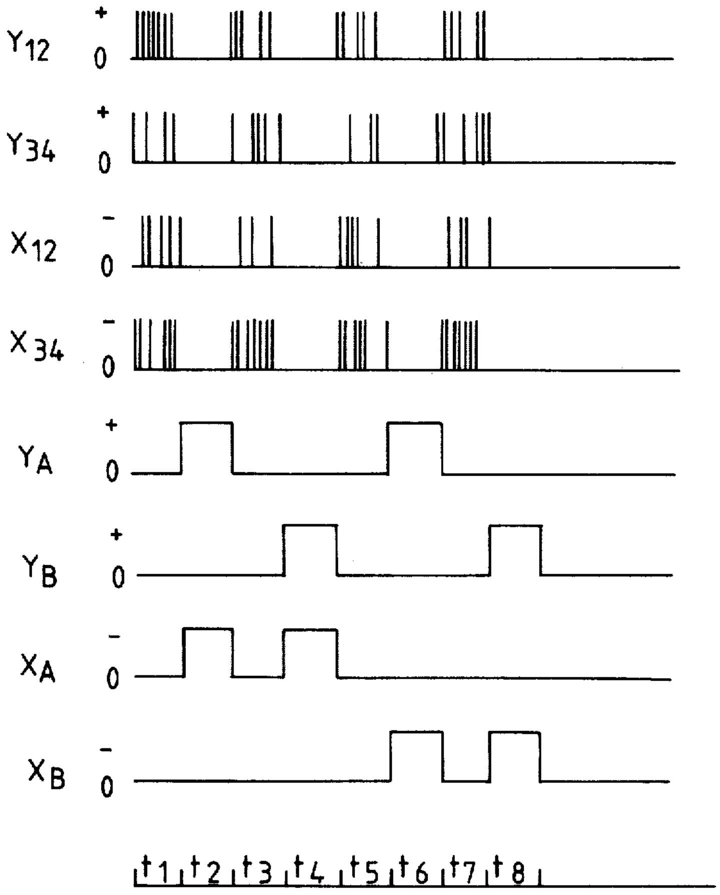
FIG. 3 is a diagram illustrating exemplary electrical signals which may be applied in the device shown in FIG. 2.

In a practical situation, many points throughout the matrix need to be addressed to build up an image of graphic information. FIG. 3 shows the kind of pattern of pulses which might be applied in such a situation for the simple matrix system of FIG. 2.

The upper portion of FIG. 3 illustrates examples of pulses which might be applied as expose pulses on lines $X_{12}$, $X_{34}$, $Y_{12}$, and $Y_{34}$. This covers just four of the sub-matrices of FIG. 2 and it will be understood that the remaining submatrices are defined by adding lines $X_{56}$, $X_{78}$, $Y_{56}$ and $Y_{78}$ to those depicted in FIG. 3. The lower portion of FIG. 3 depicts the develop pulses applied on lines $X_A$, $X_B$, $Y_A$ and $Y_B$.

In the first time period $t_1$, a succession of expose pulses are applied by way of the relevant ones of lines $X_{12}$, etc, $Y_{12}$, etc, so as to successively apply expose pulses to all the sub-matrices in which it is desired to address the top left hand point. In the second time period, $t_2$, the top left hand points of all those sub-matrices which were selected by the expose pulses in the first time period, $t_1$ are developed by the application of develop pulses by way of lines $X_A$ and $Y_A$.

In a similar fashion, expose pulses for all those sub-matrices in which it is desired to address the bottom left hand point are generated in the third time period $t_3$, and are followed in the fourth time period $t_4$ by the develop pulses for the bottom left hand points, which are applied by way of lines $X_A$ and $Y_B$. Exactly similar considerations apply for the remaining four time periods shown in FIG. 3, and which deal successively with the top right ($X_B$, $Y_A$) and bottom right ($X_B$, $Y_B$) points of the sub-matrices.

Provided the delay between the develop pulse of one addressing operation and the expose pulse of the next is adequate, the previously addressed points in each sub-matrix will not be further developed.

Although the foregoing description is concerned with the case where the expose pulses are applied to sub-matrices followed by the application of develop pulses to corresponding individual points within each of the sub-matrices, it is possible to interchange the points to which the pulses are applied. In other words, the expose pulses may be applied first to the corresponding individual points, followed by the application of develop pulses to the selected sub-matrices.

In practice, a $100\times100$ array of points might have 10 lines like $X_{12}$, 10 like $Y_{12}$, 10 like $Y_A$ and 10 like $X_A$, thus being driven by forty lines instead of the two hundred required by simple matrix addressing. If rapid selection is required, then unequal numbers of expose and develop lines would be used as to develop operation is relatively slow.

In certain circumstances, especially when only alphanumeric information is to be reproduced, it may be convenient to make each sub-matrix suitable for reproducing a single character. One typical character generating matrix is the $5\times7$ matrix, and the matrix of the present apparatus may be divided into a set of $5\times7$ sub-matrices. The 'expose' pulses then pick out only those sub-matrices in which a particular point is to be addressed, followed by 'develop' pulses which develop that point in each of the exposed sub-matrices. This procedure is repeated 34 more times, thereby covering all 35 points in the sub-matrices and completing the image.

While the invention has been particularly described and shown with reference to a preferred embodiment thereof, it will be understood by those skilled in the art that variations and modifications may be made without departing from the spirit and scope of the invention.

What is claimed is:

1. A display device including apparatus for electrically addressing a material in matrix fashion wherein each individual point in the matrix is addressable to produce a local change in an optical characteristic of the material by the application at that point of two electrical signals, the improvement comprising first and second matrix addressing means for sequentially applying first and second electrical signals to said matrix, the combination of which is sufficient to cause said local change, said first matrix addressing means for selectively applying said first signals to groups of rows and columns of said matrix defining submatrices, said second matrix addressing means for selectively applying said second signals to individual rows and columns in said submatrices to select at least one of said individual points in said submatrices and produce said local change thereat.

2. The device of claim 1 wherein said material is an electrochromic material.

3. The device of claim 1 wherein the first selection is made with an electrical pulse across said material which is of the polarity which tends to cause said change in an optical characteristic and which is of a potential above a threshold potential for said change, but which carries insufficient charge to produce said change, and the second selection is made with a potential below said threshold potential.

4. A display device including apparatus for electrically addressing a material in matrix fashion wherein each individual point in the matrix is addressable to produce a local change in an optical characteristic of the material by the application at that point of two electrical signals, the improvement comprising first matrix addressing means for selectively applying first electrical signals to groups of rows and columns of the matrix to select submatrices, said first electrical signals being of short duration and above a threshold voltage but not of sufficient charge potential to cause said local change, second matrix addressing means for selectively applying second electrical signals to individual ones of said rows and columns in each of the selected submatrices to select at least one individual point in said selected submatrices, said second electrical signals being of longer duration than said first electrical signals and below said threshold voltage and, as combined with the charge potential provided by said first electrical signals, having sufficient total charge potential to cause said local change.

5. The device of claim 4 wherein said material is an electrochromic material.

* * * * *